United States Patent [19]

Cordner et al.

[11] 3,722,324
[45] Mar. 27, 1973

[54] HYDROMECHANICAL TRANSMISSION

[75] Inventors: Michael A. Cordner; Duane H. Grimm, both of Rockford, Ill.

[73] Assignee: Sundstrand Corporation, Rockford, Ill.

[22] Filed: Nov. 1, 1971

[21] Appl. No.: 194,338

[52] U.S. Cl.................................................74/687
[51] Int. Cl............................................F16h 47/04
[58] Field of Search.......................................74/687

[56] References Cited

UNITED STATES PATENTS

| | | | |
|---|---|---|---|
| 2,817,250 | 12/1957 | Forster | 74/687 |
| 3,055,233 | 9/1962 | Giles | 74/687 |
| 3,212,358 | 10/1965 | De Lalio | 74/687 |
| 3,455,183 | 7/1969 | Orshanski, Jr. | 74/687 |
| 3,580,107 | 5/1971 | Orshanski, Jr. | 74/687 |

*Primary Examiner*—Charles J. Myhre
*Assistant Examiner*—Thomas C. Perry
*Attorney*—Axel A. Hofgren et al.

[57] ABSTRACT

A hydromechanical transmission operable in a plurality of modes, comprising, an input shaft, an output shaft, an intermediate shaft, a pair of variable displacement hydraulic units connected in circuit to function as pump and motor, a first three-element differential connected to the input shaft, to one hydraulic unit and to the intermediate shaft, a second three-element differential connected to the intermediate shaft, to the other hydraulic unit and to the output shaft, means for locking up the second differential to rotate as a unit in a first low speed hydromechanical mode of operation, and means for locking up the first differential to rotate as a unit in a second high speed hydromechanical mode of operation. In a preferred embodiment, a hydraulic boost motor is used to aid in driving the second differential in the first mode. Preferably, the intermediate shaft includes a disengageable clutch coupling with means for holding one element of the first differential when the clutch coupling is disengaged, so that all power is transmitted hydraulically.

16 Claims, 4 Drawing Figures

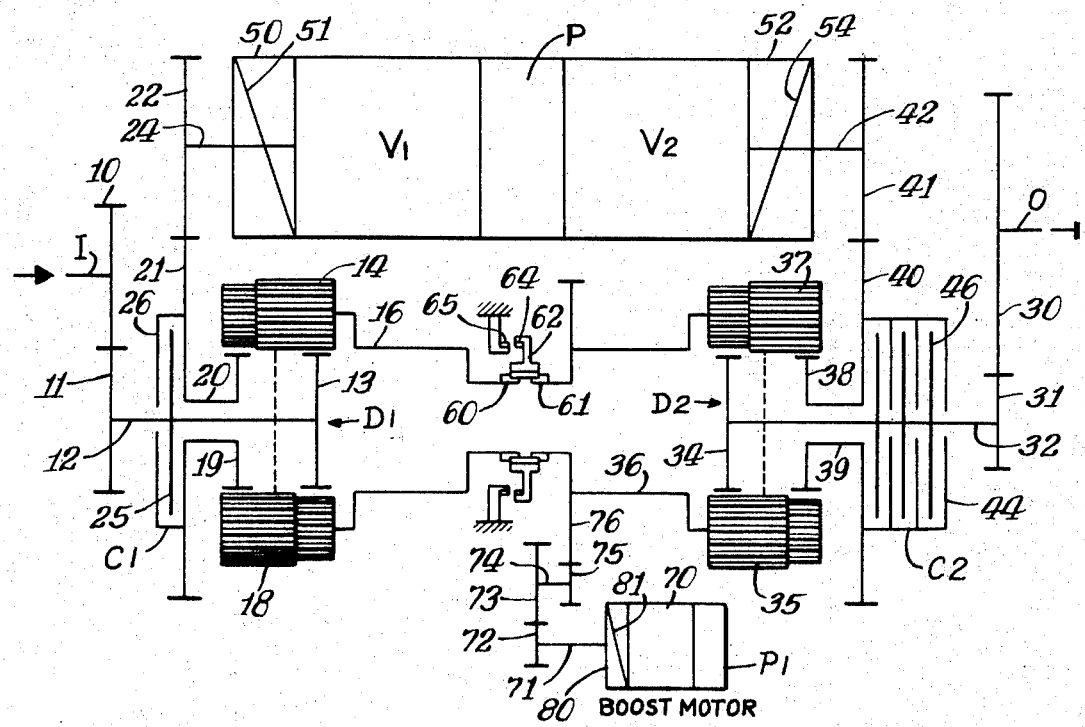

PATENTED MAR 27 1973  3,722,324

HYDROMECHANICAL TRANSMISSION

BACKGROUND OF THE INVENTION

In the past, considerable effort has been devoted to various forms of hydromechanical transmissions wherein power is transmitted mechanically and hydraulically from a prime mover to a propulsion means for a vehicle, with infinite stepless variation in speed and torque capabilities over predetermined ranges, attained through use of one or more hydraulic transmissions and one or more mechanical differentials. Some transmissions of the type described are particularly suitable for highway vehicles, while others are more suitable for off-highway heavy duty vehicles, and some are capable of both uses though usually with limitations in one or the other field.

Some of the prior transmissions have been successful from the standpoint of both performance and cost, and have been deemed worthy of commercial use. For example, U. S. PAT. Nos. 3,396,607, 3,442,153 and 3,455,184 relate to a successful transmission and various controls for a highway vehicle such as a truck. In the prior patents, the transmission includes two hydraulic units connected in closed circuit, a mechanical differential adjacent the transmission output, a first clutch for locking up the differential in a low speed purely hydrostatic mode, and a second clutch providing a high speed hydromechanical mode.

To remain competitive, continuous effort is exerted to provide improved constructions for similar applications and for different applications involving different requirements as defined by different vehicles intended for different uses. In particular, consideration has been given to improvements in efficiency, size, weight, flexibility, torque ratio over the speed range from stall to maximum speed, maximum hydraulic pressures, conditions on shifting from one mode of operation to another, and interchangeability of parts.

SUMMARY OF THE PRESENT INVENTION

The present invention relates to an improved hydromechanical transmission operable in a plurality of modes for propelling a vehicle under a wide range of conditions providing a high degree of flexibility with favorable efficiency and economic costs.

More particularly, the improved transmission includes an input shaft adapted to be driven by a prime mover, an output shaft adapted to drive the propelling wheels of a vehicle, a pair of hydraulic units connected in circuit to function as pump and motor, an intermediate shaft in parallel with the hydraulic pump and motor, a first gear differential connected to the input shaft, to one hydraulic unit and to the intermediate shaft, a second differential connected to the output shaft, to the other hydraulic unit and to the intermediate shaft, means for locking up the second differential in a first low speed hydromechanical mode in which the first differential functions as an input differential relative the pump and motor, and means for locking up the first differential in a second high speed hydromechanical mode of operation in which the second differential functions as an output differential relative to the pump and motor.

In a preferred embodiment, a hydraulic boost motor is connected to aid in driving the locked up second differential in the low speed mode.

Preferably, the transmission includes s disconnectible clutch coupling in the intermediate shaft, together with means for holding one element of the first differential when the clutch coupling is disengaged, so that all power is transmitted hydraulically.

As illustrated, the boost motor is reversible so as to also provide a reverse mode when the clutch coupling is disconnected and one element in the first differential is grounded.

The improved transmission provides very good efficiency, favorable conditions on shifting from one mode to another, including synchronous clutch elements, a high torque ratio over the speed range from stall to maximum speed, reduced working pressures, reduced size and weight, interchangeable hydraulic and differential components, and greater flexibility of operating conditions.

BRIEF DESCRIPTION OF DRAWINGS

FIG. 1 is a schematic illustration of a hydromechanical transmission embodying the principles of the present invention;

FIG. 2 is a graph with curves illustrating the speed of the hydraulic units in relation to output speed in a transmission of the type illustrated in FIG. 1;

FIG. 3 is a graph with curves illustrating the positions of the displacement varying means in the hydraulic units in relation to output speed in a transmission of the type illustrated in FIG. 1; and FIG. 4 is a diagrammatic illustration of another embodiment of a transmission embodying the principles of the present invention, in somewhat more detail than in FIG. 1, including a disconnectible clutch coupling between the two differentials, and a boost motor for applying power to the second differential.

DETAILED DESCRIPTION OF THE INVENTION

Referring now to the drawings in more detail, the transmission illustrated in FIG. 1 includes an input shaft I adapted to be connected to a suitable prime mover, an output shaft O adapted to be connected to drive the propelling wheels of a vehicle, a first differential D1 connected to the input shaft I, a second differential D2 connected to the output shaft 0, and an intermediate shaft S connecting the two differentials. A first variable displacement hydraulic unit V1 is connected to the first differential D1, and a second variable displacement hydraulic unit V2 is connected to the second differential D2. The hydraulic units V1 and V2 are connected in hydraulic circuit through the medium of a valve plate as at P mounted between the units.

Each of the differentials D1 and D2 is a three-element mechanical gear differential which may be of the type illustrated in FIG. 4. The differential D1 includes a first gear connected to be driven by the input shaft I, a second gear connected in driving relationship with the variable displacement hydraulic unit V1, and a carrier with interengaged gears respectively in mesh with the input gear and the hydraulic unit gear. The carrier is connected for rotation with the intermediate shaft S. The second differential D2 includes a first gear connected in driving relationship with the output shaft O, a second gear connected in driving relationship with the hydraulic unit V2 and a carrier with interengaged gears respectively in mesh with the output gear and the hydraulic unit gear. The carrier in the differential D2 is also connected for rotation with the intermediate shaft S.

In association with the first differential D1, there is a clutch as illustrated at C1 for locking two of the differential elements together so that the differential rotates as a unit. As illustrated in FIG. 1, the clutch C1 is shown as connecting the input gear and the carrier, but it should be understood that the clutch may be utilized to connect any two of the differential elements for purposes of locking the differential to rotate as a unit. In the illustration of FIG. 4, for example, a clutch is utilized for connecting the input gear and the gear associated with the hydraulic unit. Similarly, in association with the second differential D2, there is a clutch C2 for connecting two of the differential elements together in order to lock the differential for rotation as a unit. As in the first differential, the clutch is shown connecting the carrier and the output shaft, but it may be utilized in an arrangement to connect the output shaft and the gear associated with the hydraulic unit V2. Preferably, the differential elements in the differential D1 are of similar size and construction as the corresponding differential elements in the differential D2 so as to permit interchangeability of parts.

The hydraulic units V1 and V2 are also preferably of similar size and construction. Each is preferably an axial piston hydraulic unit of the type utilizing a rotatable cylinder block with an annular series of axially disposed cylinders arranged around the axis of rotation and receiving reciprocable pistons adapted to be controlled by a variable angle cam or swashplate mounted for pivotal movement in opposite directions from a neutral central position, so that displacement in each of these hydraulic units may be varied in opposite directions.

In operation, a first mode is provided by engaging the clutch C2 to lock up the differential D2 to rotate as a unit, while the differential D1 is free to function differentially as an input differential relative to the hydrostatic transmission comprising the variable hydraulic units V1 and V2. In a second mode of operation, the clutch C2 is disengaged and the clutch C1 is engaged, so that the first differential D1 is locked up to rotate as a unit, while the second differential D2 is free to operate differentially as an output differential relative to the hydrostatic transmission including the variable hydraulic units V1 and V2.

In the first low speed mode referred to above, operation is initiated with the clutch C2 engaged, with the clutch C1 disengaged, with the variable unit V2 at full displacement in one direction from neutral which may be referred to as a positive direction for convenience of description, as illustrated in the graph of FIG. 3, and with the hydraulic unit V1 at zero displacement as illustrated in the graph of FIG. 3. Initially, with the engine running, the load on the output shaft O holds the differential D2 stationary, and the hydraulic unit V2 is stationary as shown in the graph of FIG. 2. The differential D1 is spinning, driving the hydraulic unit V1 in a direction which may be referred to as a negative direction as illustrated in FIG. 2, at no stroke. Transmission of power to the output shaft is initiated by moving the displacement varying means in the hydraulic unit V1 in a negative direction as illustrated in FIG. 3, while the hydraulic unit V2 is at full displacement in a positive direction. Since the hydraulic unit V2 is initially stationary and subjected to the entire load on the output shaft, operation of the hydraulic unit V1, as its displacement is increased in a negative direction, builds up pressure in the hydraulic circuit which must be relieved over a relief valve in the valve plate P during a portion of the range of operation represented by the crosshatched area in FIG. 3. The resistance afforded by the load on the hydraulic unit V1 causes a reaction in the differential D1, resulting in rotation of the intermediate shaft S and transmission of power through the locked up differential D2 to the output shaft O. Gradually, the hydraulic unit V2 attains speed, driven as a motor, from the fluid delivered by the hydraulic unit V1, functioning as a pump, and some of the power is transmitted to the output shafts through the hydraulic V2. As indicated in FIG. 2, the increasing load on the hydraulic unit V1 results in reducing the speed of the hydraulic unit V1. Partway through the first of operation, when both hydraulic units are at full stroke, and the speeds of the two units are comparable, power is no longer dissipated over the relief valve.

After the hydraulic unit V1 attains maximum displacement in a negative direction, the displacement of the hydraulic unit V2 is reduced toward zero displacement, as shown in the graph of FIG. 3, as a result of which its speed is increased as shown in the graph of FIG. 2. Ultimately, when the displacement of the hydraulic unit V2 is at zero, as shown in FIG. 3, the hydraulic unit V1 is prevented from rotation and its speed is at zero as shown in the graph of FIG. 2. At that time, about half way through the first mode, the drive to the output shaft is straight through the mechanical path including the differential D1, the intermediate shaft S and the locked-up differential D2. The unit $V_1$ ceases to function as a pump, while the unit V2 ceases to function as a motor and begins to function as a pump. Displacement of the hydraulic unit V2 is then varied toward maximum in a negative direction as shown by the graph of FIG. 3. The direction of rotation of the variable unit V1 is reversed at this time as shown in the graph of FIG. 2. Now, the speed of the hydraulic unit V1 is increased in a positive direction as the displacement of the hydraulic unit V2 increases in a negative direction, and the speed of the hydraulic unit V2 increases to a maximum value shown in FIG. 2, attained when the speed of the hydraulic unit V1 is maximum in a positive direction and the displacement of the hydraulic unit V2 is a maximum in a negative direction. At this time, the shift in mode from the first mode to the second mode occurs by energization of the clutch C1 while the clutch elements are rotating synchronously, followed by deenergization of the clutch C2 associated with the differential D2.

In the second mode, with the differential D1 locked up, the hydraulic unit V1 is driven at a speed corresponding to the speed of shaft I (assumed to be constant for this analysis), as illustrated at the top of the graph in FIG. 2. During the second mode, the displacement of the hydraulic unit V2 is maintained at maximum in a negative direction as shown in FIG. 3, and the ratio is varied by varying the displacement of the hydraulic unit V1 from maximum in a negative direction toward neutral and then from neutral toward maximum in a positive direction as shown in the graph of FIG. 3. The variation in displacement of the hydraulic unit V1 has the effect of reducing the speed of the hydraulic unit V2 from maximum in a positive direction toward zero speed and zero toward maximum in a negative direction as will be understood on reference to the graph of FIG. 2.

During operation in the second mode, with the differential D2 free to function as an output differential relative to the hydrostatic transmission, the variable unit V2 is initially subtracting speed from the output shaft at the differential D2. As the speed of the hydraulic unit V2 is reduced toward zero in the first half of the second mode, it subtracts less and less from the output shaft. About half way through the second mode when the speed of the variable unit V2 is zero and the stroke of the hydraulic unit V1 is at zero, the drive is straight through from the input shaft I, the locked-up differential D1 and the differential D2, to the output shaft O. In the second half of the second mode, the unit V1 again functions as a pump, and the V2 again functions as a motor. As the displacement of the hydraulic unit V1 is increased toward maximum, the hydraulic unit V2 adds more and more speed to the output shaft through the differential D2.

Referring now to the embodiment illustrated in FIG. 4, the transmission is similar in many respects to the transmission illustrated in FIG. 1, but additionally includes a boost motor for purposes of assisting in the drive on initiation of the first mode of operation to avoid dissipation of power as described in connection with FIG. 1. The embodiment of FIG. 4 also includes a disconnectible clutch coupling in the intermediate shaft between the two differentials, together with means for holding the carrier in the first differential when the clutch coupling is disconnected, for purposes of transmitting all power hydraulically. By reversing the displacement of the boost motor, it may be utilized in a reverse operation.

In an exemplary installation, the input shaft may be driven by an engine rated approximately at 200 horsepower at 2,100 r.p.m. The output shaft may be driven from zero speed to as much as 1.5 times the input speed. The intermediate shaft connecting the two differentials has a speed from zero to 2,100 r.p.m. in the first mode and rotates at a constant speed of 2,100 r.p.m. in the second mode of operation. The working pressure remains substantially constant throughout both modes of operation and may be on the order of 4,500 pounds psi. The vehicle may attain a speed as high as 70 m.p.h. The shift in mode from the first mode to the second mode may occur at approximately 23 m.p.h. The straight-through mechanical operation previously referred to would occur at approximately 11 m.p.h. and 46 m.p.h.

Referring now to FIG. 4 in more detail, the input shaft I is connected to drive the differential D1, and the latter is adapted to be locked up by a hydraulically operable friction clutch C1. The output shaft O is arranged to be driven by the differential D2, and the latter is adapted to be locked up by a hydraulically operable friction clutch C2. Variable hydraulic unit V1 is connected with differential D1, and variable hydraulic unit V2 is connected with differential D2.

As illustrated in FIG. 4, input shaft I has a gear 10 meshing with a gear 11 on a shaft 12 carrying a gear 13 in the differential D1. The gear 13 meshes with one or more planetary gears as at 14 on a carrier 16 which also carries one or more planetary gears 18 meshing with the gears 14 and also meshing with a gear 19 on a shaft 20 also carrying a gear 21. The gear 21 meshes with a gear 22 on an input shaft 24 in the hydraulic unit V1. In a typical installation, the differential D1 may include three gears as at 14 and three gears as at 18. The clutch C1 includes one or more discs as at 25 on the shaft 12, and one or more discs as at 26 on the shaft 20, so that the clutch is arranged to lock the gears 13 and 19 together to provide for rotation of the differential as a unit.

The output shaft O includes a gear 30 meshing with a gear 31 on a shaft 32. The shaft 32 also has a gear 34 meshing with one or more gears as at 35 on a carrier 36. The gears 35 also mesh with gears as at 37 on the carrier 36, in turn meshing with the gear 38 on a shaft 39. The shaft 39 also carries a gear 40 meshing with a gear 41 on an output shaft 42 in the hydraulic unit V2. The clutch C2 includes friction discs as at 44 on the shaft 39 interfitted with friction discs as at 46 on the shaft 32, so that the clutch is adapted to lock the gears 34 and 38 together to obtain rotation of the differential as a unit.

Each of the hydraulic units V1 and V2 may be similar to that described in connection with the embodiment of FIG. 1. The two hydraulic units are connected in hydraulic circuit by means of an intervening valve plate P as in FIG. 1. Displacement varying means for the hydraulic unit V1 is illustrated diagrammatically at 50, and may take the form of a variable cam or swashplate 51 pivotable in opposite directions from neutral to vary the displacement of the hydraulic unit under control of a conventional piston and cylinder device. Displacement varying means in the hydraulic unit V2 is represented diagrammatically at 52 and may take the form of a variable angle cam or swashplate 54 adapted to be pivoted in opposite directions from a neutral central position to vary the displacement of the hydraulic unit under control of a suitable piston and cylinder device.

The carrier 16 in the differential D1 and the carrier 36 in the differential D2 are connected by a disconnectible clutch coupling including a clutch member 60 on the carrier 16, and clutch member 61 on the carrier 36, and an axially slidable coupling member 62 adapted to connect the two carriers for rotation when the internal teeth on the coupling member mesh with both the clutch member 60 and the clutch member 61, as illustrated in FIG. 4. When the coupling member 62 is positioned as illustrated, the transmission of FIG. 4 is operable in substantially the same manner as the transmission of FIG. 1, except for the use of a boost motor, as described presently, to avoid dissipation of power on initiating transmission operation.

For purposes that will appear shortly, the coupling member 62 is adapted to be moved axially from the position illustrated in FIG. 4 to a position where the internal teeth remain in mesh with the clutch member 60 but are disconnected from the clutch member 61. At the same time, the coupling member 62 includes additional teeth as at 64 adapted to mesh with teeth on a stationary ring 65 in a manner to hold the carrier 16 stationary.

In order to avoid dissipation of power on initiation of operation of the transmission under high torque conditions, a boost motor is provided at 70, including an output shaft 71 with a gear 72. The gear 72 meshes with the gear 73 on an intermediate shaft 74 also carrying a gear 75 which meshes with a gear 76 on the carrier 36. The boost motor 70 may comprise an axial piston hydraulic unit similar to those at V1 and V2, though of smaller size, including a displacement varying means indicated diagrammatically at 80 which may take the form of a variable angle cam or swashplate 81 movable in opposite directions from a neutral center position in order to vary the displacement of the motor in opposite directions from neutral. The boost motor 70 is associated with an appropriate valving means represented at P1.

In operation, the transmission illustrated in FIG. 4 functions in a manner similar to that illustrated in FIG. 1, except that in the first part of the first mode, power is not dissipated over a relief valve in the valve apparatus P, but instead is ported through the valve apparatus P1 to the boost motor 70 for purposes of operating the latter in a direction to aid the drive of the differential carrier 36. In this fashion, the power dissipated in the system of FIG. 1 is utilized for unit assisting the drive of the output shaft O. During such operation, the boost motor 70 is operated as a variable displacement motor, and the displacement is varied from maximum toward neutral. The speed of the boost motor increases as shown by the broken line in FIG. 2. The stroke of the boost motor may be varied approximately with the stroke of the variable unit V1 as shown by the broken line in FIG. 3. Alternatively, the variation in stroke may occur sequentially, following adjustment of the variable unit V1 to maximum in a negative direction. In order to avoid overspeeding of the boost motor after its displacement is adjusted to zero, an overrunning clutch may be provided between the carrier 36 and the boost motor shaft 71 to allow the carrier to overrun the boost motor.

To obtain reverse operation of the transmission, the hydraulic unit V2 is held at full displacement in the positive direction as indicated by the graph in FIG. 3. The carrier in the differential D1 is held stationary as described, so that the input power is transmitted through the differential D1. The hydraulic unit V1 is moved from zero stroke toward full stroke in a positive direction (opposite from the direction for forward drive), as a result of which the hydraulic unit V2 is operated reversely to drive the output through the differential D2, which is locked up by clutch C2, to rotate as a unit. All the power is transmitted hydraulically.

If desired, the boost motor may be used with the hydraulic unit V2 to obtain a high torque reverse mode. In this case the boost motor is used as a fixed displacement motor at full displacement in the reverse direction, and fluid from the unit V1 is also delivered to the boost motor. This mode may produce vehicle movement up to about 5 or 6 m.p.h. when the hydraulic unit V1 reaches full displacement.

If it is found to be desirable, the transmission may be utilized to transmit all power hydraulically in a forward direction. To obtain such operation, the hydraulic unit V2 is held at full displacement in the positive direction illustrated in FIG. 3. With the carrier locked in the differential D1, power from the input shaft is transmitted through the differential to rotate the hydraulic unit V1. The latter is moved from zero stroke toward full stroke in a negative direction as shown in FIG. 3, as a result of which fluid is supplied to operate the hydraulic unit V2 in a forward direction. This results in driving the output shaft through the locked up differential D2. Fluid from the hydraulic unit V1 may also be delivered to the boost motor to assist the unit V2.

The transmission may be controlled in accordance with principles along the lines of those set forth in the aforementioned U.S. Pat. Nos. 3,396,607, 3,442,153 and 3,455,184. In general, engine speed is controlled as a function of driver command. A speed sensor detects engine speed, and a governor controls the engine speed by controlling the transmission ratio, and by controlling the fuel to the engine when the ratio control is insufficient to control engine speed.

We claim:
1. A hydromechanical transmission, comprising,
 a. an input shaft,
 b. an output shaft,
 c. a pair of hydraulic units connected to function as pump and motor,
 d. a first mechanical gear differential having
  1. a first element connected with the input shaft,
  2. a second element connected with one hydraulic unit, and
  3. a third element connected with the first and second elements,
 e. a second mechanical gear differential having
  1. a first element connected with the output shaft,
  2. a second element connected with the other hydraulic unit, and
  3. a third element connected with the first and second elements,
 f. means connecting the third elements in the two differentials to rotate together,
 g. means for locking two of the elements of the first differential together, and
 h. means for locking two of the elements of the second differential together.

2. A hydromechanical transmission as defined in claim 1, including means for varying the displacement of both hydraulic units in opposite directions from neutral.

3. A hydromechanical transmission as defined in claim 1, including a clutch in each differential for locking the first and second elements together.

4. A hydromechanical transmission as defined in claim 1, wherein each differential includes a first gear connected to one of said shafts, a second gear connected to one of said hydraulic units, and a carrier having intermeshing gears respectively engaging the first and second gears.

5. A hydromechanical transmission as defined in claim 1, including a third hydraulic unit connected for driving one element in the second differential.

6. A hydromechanical transmission as defined in claim 1, including disengageable clutch means connecting the third elements in the two differentials, and means for holding the third element in the first differential stationary when the clutch means is disengaged.

7. A hydromechanical transmission as defined in claim 6, including a third hydraulic unit connected for driving one element in the second differential when the clutch means is disengaged.

8. A hydromechanical transmission as defined in claim 7, including means for varying the displacement of the third hydraulic unit in opposite directions from neutral to drive the output shaft forwardly or reversely.

9. A hydromechanical transmission comprising,
 a. an input shaft,
 b. an output shaft,
 c. a first variable displacement hydraulic unit,
 d. a second variable displacement hydraulic unit,
 e. means hydraulically interconnecting the hydraulic units in circuit to function as pump and motor,
 f. means for varying the displacement of the first hydraulic unit in opposite directions from neutral,
 g. means for varying the displacement of the second hydraulic unit in opposite directions from neutral,
 h. a first differential having
  1. first gear means connected with the input shaft,
  2. second gear means connected with the first hydraulic unit, and
  3. third gear means connected with the first and second gear means,
 i. a second differential having
  1. first gear means connected with the output shaft,
  2. second gear means connected with the second hydraulic unit, and
  3. third gear means connected with the first and second gear means,
 j. means connecting the third gear means in the two differentials together,
 k. clutch means for locking the first and second gear means together in the first differential, and
 l. clutch means for locking the first and second gear means together in the second differential.

10. A hydromechanical transmission as defined in claim 9, wherein the third gear means in each differential includes a gear carrier including a pair of gears meshing with each other and respectively meshing with the first and second gear means.

11. A hydromechanical transmission as defined in claim 9, including a third hydraulic unit connected for driving one gear means in the second differential.

12. A hydromechanical transmission as defined in claim 10, including disengageable clutch means connecting the third gear means in the two differentials, means for holding the third gear means in the first differential when the latter is disconnected from the second differential, and a third hydraulic unit connected for driving the third gear means in the second differential when the latter is disconnected from the first differential.

13. A hydromechanical transmission operable in a plurality of modes comprising,
 a. an input shaft,
 b. an output shaft,
 e. a hydrostatic transmission including a pair of reversible variable displacement hydraulic units hydraulically connected in circuit to function as pump and motor,
 d. a first mechanical gear differential having
  1. a first element connected with the input shaft,
  2. a second element connected with one hydraulic unit, and
  3. A third element connected with the first and second elements,
 e. a second mechanical gear differential having
  1. a first element connected with the output shaft,
  2. a second element connected with the other hydraulic unit, and
  3. a third element connected with the first and second elements,
 f. means connecting the third elements in the two differentials to rotate together,
 g. means for locking up the elements of the second differential to rotate as a unit, while the first differential is free to function as an input differential to the hydrostatic transmission in a first mode of operation, and
 h. means for locking up the elements of the first differential to rotate as a unit, while the second differential is free to function as an output differential from the hydrostatic transmission in a second mode of operation.

14. A hydromechanical transmission as defined in claim 13, including a third variable displacement hydraulic unit connected for driving the second differential in the first mode of operation.

15. A hydromechanical transmission as define in claim 12, including disengageable clutch means connecting the third elements in the two differentials, means for holding the third element in the first differential stationary when the clutch means is disengaged, and a third variable displacement hydraulic unit connected for driving the third element in the second differential when the clutch means is disengaged, in a third mode of operation.

16. A hydromechanical transmission as defined in claim 14, including means for reversing the displacement of the third hydraulic unit.

* * * * *